May 5, 1970   C. PETRIDES   3,510,747
TWO PART SEPARABLE BATTERY CHARGER
Filed April 2, 1964   2 Sheets-Sheet 1

Inventor:
Christie Petrides.
by Leonard Platt
His Attorney

May 5, 1970  C. PETRIDES  3,510,747
TWO PART SEPARABLE BATTERY CHARGER
Filed April 2, 1964  2 Sheets-Sheet 2

Inventor:
Christie Petrides
by Leonard J. Platt
His Attorney

United States Patent Office

3,510,747
Patented May 5, 1970

3,510,747
TWO PART SEPARABLE BATTERY CHARGER
Christie Petrides, Medway, Mass., assignor to General
Electric Company, a corporation of New York
Filed Apr. 2, 1964, Ser. No. 356,822
Int. Cl. H02j 7/02
U.S. Cl. 320—59
6 Claims

ABSTRACT OF THE DISCLOSURE

A battery charger for portable, hand held devices such as an electric toothbrush. A storage receptacle for connection to a convenience A.C. outlet contains the primary winding and core of a transformer. The portable device containing the secondary winding and a rectifier is positioned within the storage receptacle to charge a battery within the portable device.

This invention relates to battery chargers and, more particularly, to battery chargers adapted to charge the batteries used in portable, hand-held, battery-operated devices.

In recent years a number of battery-operated, hand-held devices have been marketed in which the handle of the device encloses a motor for powering the operative elements of the device and the batteries for supplying energy to the motor. The batteries used with such devices are small, rechargeable batteries, quite often of the nickel-cadmium type. A number of battery chargers have been produced for recharging the batteries of these hand-held devices after they have been discharged by use. Such recharging devices have electrical contacts with cooperate with contacts mounted in the casing of the hand-held device in order to transfer electrical energy to the batteries. Such constructions involve a number of problems. For instance, the mounting for the contacts in the casing presents a point of possible entry of moisture into the casing and for best performance the casing should be retained watertight. Furthermore, a low voltage is used to charge the batteries. Therefore, any increase in contact resistance, due to contact corrosion, erosion, misalignment, etc., could prevent adequate charging of the battery.

It is an object of my invention to provide a battery charger which insures adequate charging of the battery.

It is another object of my invention to provide hand-held, battery-operated devices having watertight casings.

It is a further object of my invention to provide such a charger that is simple in construction, easy and convenient to operate from conventional sources of electrical energy, and efficient in use.

In accordance with my invention, in one form thereof, I provide a two-part, separable battery charger including a receptacle of magnetically permeable material. An electrical winding is mounted in the receptacle and provided with leads for connection to a conventional source of AC power. One end of the casing for an associated battery-operated device has mounted therein a second electrical winding. This end of the casing is adapted for insertion within the receptacle adjacent the first electrical winding so that the first and second windings are inductively connected and form the primary and secondary windings respectively of an electrical transformer. The second winding is connected to a rechargeable battery by means of a rectifier circuit so that, when the hand-held device is inserted in the receptacle, the battery will be recharged.

My invention will be better understood from the following description taken in conjunction with the accompanying drawings in which.

Figure 1:
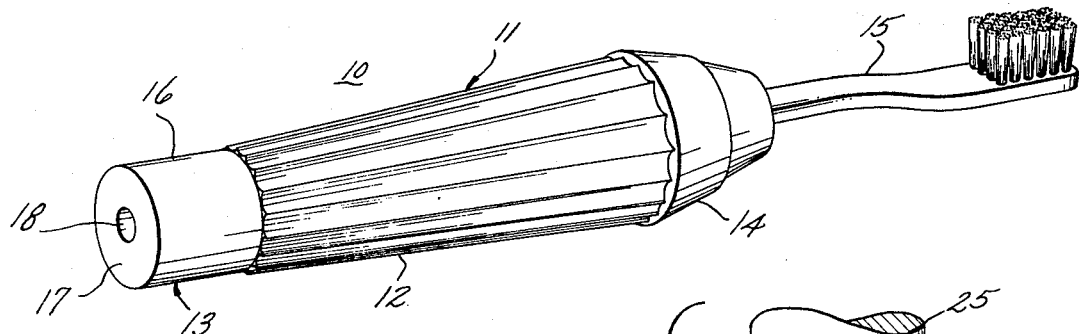
FIG. 1 is a perspective view of a hand-held, battery-operated toothbrush including the secondary winding of my improved battery charger.

Referring now to FIG. 1 there is shown a hand-held battery-operated device 10 including a casing 11. The casing 11 has a central portion 12 which provides a handgrip for the user and separates a base portion 13 and head portion 14. The implement of the hand-held device 10, in the case illustrated a toothbrush 15, is inserted within the casing through the head portion 14 to be operatively connected to a motor (not shown) which is enclosed within the casing 11. The base portion 13 is formed from plastic or other non-magnetic material and includes an outer cylindrical wall 16 and a flat bottom wall 17. The center portion of the bottom wall 17 is formed as an inner cylindrical wall 18 extending upwardly within and spaced from the outer wall 16 to form a central recess 19 (best seen in FIG. 2).

Figure 2:
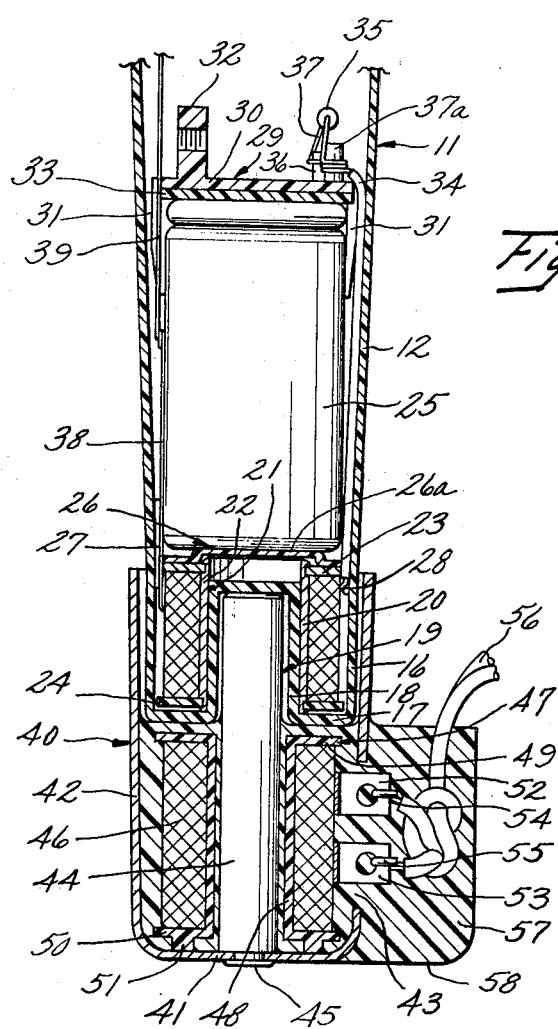
FIG. 2 is an elevational view of my battery charger, partially in cross section and with portions of the hand-held device removed for purposes of clarity.
Figure 3:
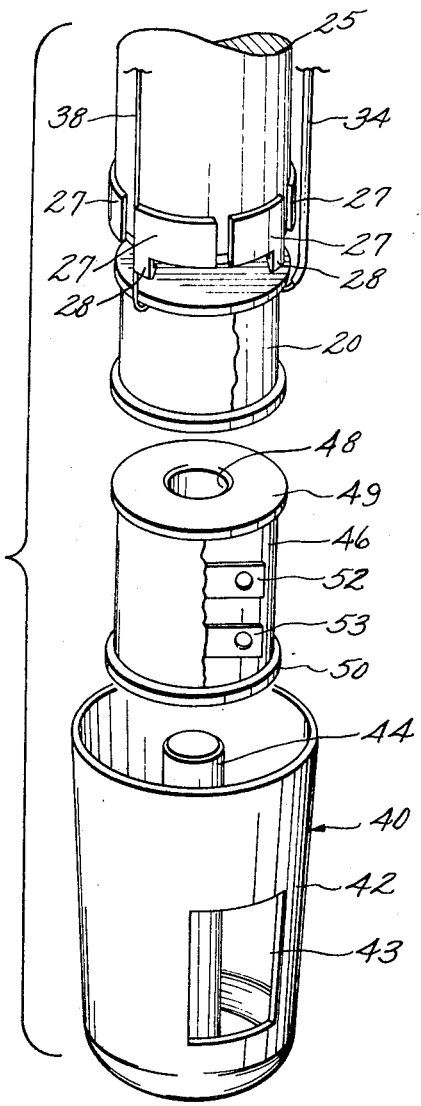
FIG. 3 is an exploded view of a portion of the battery charger of FIG. 2.
Figure 4:
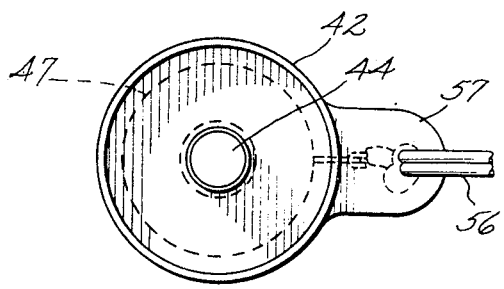
FIG. 4 is a plan view of the receptacle portion of the battery charger of FIG. 2.

Referring now to FIG. 2, an electrical winding 20 is mounted on a metal coil form 21 including an inner cylindrical metal wall 22, an upper metal wall 23 and a lower fiber or plastic wall 24. The winding 20 is mounted within the base portion 13 of casing 11 by inserting inner wall 22 about inner wall 18 until the coil form 21 comes into contact with bottom wall 17.

A rechargeable battery 25 is mounted within the casing 11 above the winding 20. The lower end of the battery is secured to the top of coil form 21 by a cap member 26 having a base section 26a of heat insulating material which separates the battery 25 from the upper end of winding 20 and forms a heat shield therebetween. A number of resilient fingers 27 extend upwardly from base section 26a and engage battery 25 with a firm friction fit. A number of lugs 28 extend downwardly from base section 26a and fit around the edge of upper wall 23 to attach the battery to the coil form. A similar cap 29 is provided to secure the battery 25 to the motor (not shown). The cap 29 includes a base portion 30 of heat insulating material which extends between the battery 25 and the motor and serves as a heat shield. A number of resilient fingers 31 extend downwardly from base portion 30 to engage the battery 25 with a firm friction fit. A screw-threaded lug 32 extends upwardly from base portion 30 for attaching the motor (not shown) to cap 29. A spacer 33 of resilient plastic material is positioned between the cap 29 and the top of battery 25 to insure proper positioning of the elements.

One lead 34 of winding 20 is connected to a diode 35. The diode is also connected to the positive terminal 36 of battery 25 by a lead 37, thus forming a rectifier circuit between the winding and the battery. For structural support and physical positioning of the diode 35 the lead 34 is wound about a post 37a extending upwardly from base portion 30 of cap 29. The other lead 38 of winding 20 is connected to the negative terminal 39 of battery 25. Thus an electrical circuit is formed from winding 20 through lead 34, diode 35, lead 37, battery 25 and lead 38 back to winding 20.

In order to mount the hand-held device for charging the battery, I provide a metal cup-like receptacle 40 formed magnetically permeable material. The receptacle includes a flat base portion 41 and a generally cylindrical upstanding side wall 42 including a cutaway portion or opening 43. The top of the side wall 42 is open to receive base portion 13 of casing 11. A stud 44 of magnetically permeable material is attached to the center of the base portion 41 in a conventional manner, such as the swaged connection 45. The stud 44 extends upwardly within the receptacle to a point a short distance below the top of wall 42. An electrical winding 46 is mounted on a coil form 47 having an inner cylindrical wall 48, a top wall 49 and a bottom wall 50. The winding 46 and coil form 47 are inserted in the receptacle 40 until a ring-shaped protrusion 51 depending from the bottom wall 50 of the coil form 47 contacts the base portion 41. The winding 46 includes a pair of terminals 52 and 53 which extend through the opening 43 and are attached to the leads 54 and 55 of an electrical conductor 56 to connect the winding 46 to a conventional source of electrical energy, such as the 60-cycle, 110-volt electrical outlets usually provided in a house.

A body of potting material 57 is provided which encloses the winding 46 and coil form 47 and surrounds the lower end of stud 44 to hold them firmly in place within the receptacle 40. The body of potting material 57 extends outwardly through the opening 43 so as to enclose and electrically insulate the connections between the terminals 52 and 53 and the leads 54 and 55. The lower surface 58 of the body of potting material 57 is formed as an extension of base portion 41 of receptacle 40 to insure that the receptacle 40 is stable when placed on a suitable flat surface for charging battery 25.

Figure 5:
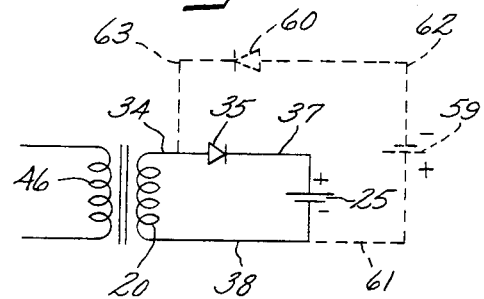
FIG. 5 is a schematic diagram of the electrical circuit of my battery charger.

Referring now to FIG. 5 it will be seen that diode 35 is connected in series between winding 20 and battery 25 by leads 34 and 37. The other end of winding 20 is connected to battery 25 by lead 38. Thus, when base portion 13 of casing 11 is inserted within the cylindrical side wall 42 of receptacle 40 with the upper end of stud 44 received within recess 19, windings 46 and 20 form the primary and secondary windings respectively of a current transformer. Thus, if conductor 56 is connected to a conventional source of electric energy, an electromotive force will be induced in winding 20 and a current will flow in the circuit including winding 20, lead 34, diode 35, lead 37, battery 25, and lead 38. However, it will be noted that diode 35 will only allow current to flow on every other half cycle; therefore, the alternating voltage induced in winding 20 will effectively charge battery 25.

It will be understood that, if it is desired to use a hand-held device requiring two rechargeable batteries, my improved battery charger will effectively charge both batteries. In this case a second battery 59 and a second diode 60 are connected in parallel with battery 25 and diode 35 by leads 61, 62, and 63. This additional circuit is schematically shown in broken line in FIG. 5 and it will be noted that the battery 59, diode 60 are oppositely poled with respect to battery 25 and diode 35. Thus, when winding 46 is connected to a conventional source of electric energy, the batteries 25 and 59 will be charged during alternate half cycles.

From the foregoing description, it will be apparent that I have provided an improved battery charger that is adapted to charge rechargeable batteries from sources of conventional electric energy found in the modern home. By inductively transferring the electrical energy between the main winding 46 and the secondary winding 20, I have eliminated electrical contacts which can cause improper charging of the battery. Furthermore, I have provided a battery-operated device having a watertight casing.

What I claim is:

1. A battery charger including:
(a) a receptacle of magnetically permeable material,
(b) a first electrical winding received in one end of said receptacle and forming the primary winding of a transformer,
(c) a stud of magnetically permeable material mounted in the center of said first winding and extending therefrom within said receptacle,
(d) a hollow casing for receiving a rechargeable battery,
(e) one end of said casing including a wall forming a recess for receiving said stud when said one end of said casing is inserted within said receptacle,
(f) a second electrical winding mounted in said one end of said casing around said wall forming a recess and forming the secondary winding of said transformer,
(g) means including a rectifier circuit for electrically connecting said second winding to the battery.

2. A battery charger including:
(a) generally cylindrical receptacle of magnetically permeable material, closed at one end,
(b) a first electrical winding received in the closed end of said receptacle and forming the primary winding of a transformer,
(c) a stud of magnetically permeable material mounted in said receptacle and extending through the center of said first winding,
(d) a hollow casing for receiving a rechargeable battery,
(e) one end of said casing including an inner cylindrical wall forming a recess for receiving said stud when said one end of said casing is inserted within said generally cylindrical receptacle,
(f) a second electrical winding mounted in said one end of said casing, around said inner cylindrical wall and forming the secondary winding of said transformer,
(g) means including a rectifier circuit for electrically connecting said second winding to the battery.

3. A battery charger including:
(a) generally cylindrical receptacle of magnetically permeable material, closed at one end,
(b) a first electrical winding received in the closed end of said receptacle and forming the primary winding of a transformer,
(c) a stud of magnetically permeable material mounted in said receptacle and extending through the center of said first winding,
(d) a hollow casing for receiving a rechargeable battery,
(e) one end of said casing including a generally cylindrical inner wall forming a recess for receiving said stud and a generally cylindrical outer wall for receipt within said receptacle so that when said one end of said casing is inserted within said receptacle said stud is positioned within said recess,
(f) a second electrical winding received within said one end of said casing between said outer wall and said central recess and forming the secondary winding of said transformer,
(g) means including a rectifier circuit for electrically connecting said second winding to the battery.

4. A battery charger including:
(a) a generally cup-shaped receptacle of magnetically permeable material having a flat base portion and an upstanding cylindrical wall portion,
(b) said wall portion having an opening in the lower section thereof,
(c) a stud of magnetically permeable material mounted on said base portion and extending upwardly within said wall portion,
(d) a first electrical winding received about said stud adjacent said base portion and forming the primary winding of a transformer,
(e) said first winding including a pair of terminals,
(f) a pair of electrical leads attached to said terminals through said opening in said wall portion to form a connection for supplying electrical energy to said first winding,
(g) a body of potting material securing said first winding in said receptacle and enclosing said connection,
(h) a hollow casing for receiving a rechargeable battery,
(i) one end of said casing including an inner cylindrical wall for receipt within said receptacle so that when said one end of said casing is inserted within said receptacle said stud is positioned within said recess, (j) a second electrical winding received within said one end of said casing between said outer wall and said central recess and forming the secondary winding of said transformer, (k) means including a rectifier circuit for electrically connecting said second winding to the battery.

5. A battery charger including:
(a) a receptacle,
(b) a first electrical winding received in one end of said receptacle and forming the primary winding of a transformer,
(c) a stud of magnetically permeable material mounted in the center of said first winding and extending therefrom within said receptacle,
(d) a hollow casing for receiving a rechargeable battery,
(e) one end of said casing including a wall forming a recess for receiving said stud when said one end of said casing is inserted within said receptacle,
(f) a second electrical winding mounted in said one end of said casing around said wall forming a recess and forming the secondary winding of said transformer,
(g) means including a rectifier circuit for electrically connecting said second winding to the battery.

6. A battery charger including:
(a) a member of magnetically permeable material,
(b) a first electrical winding positioned adjacent said member and inwardly thereof and forming the primary winding of a transformer,
(c) a stud of magnetically permeable material positioned inwardly of said member and inwardly of said first winding,
(d) a hollow casing for receiving a rechargeable battery,
(e) one end of said casing including a wall forming a recess for receiving said stud when said one end of said casing is positioned adjacent to said member,
(f) a second electrical winding mounted in said one end of said casing around said wall forming a recess and forming the secondary winding of said transformer, and
(g) means including a rectifier circuit for electrically connecting said second winding to the battery.

References Cited

UNITED STATES PATENTS

| | | | |
|---|---|---|---|
| 2,415,688 | 2/1947 | Hall | 219—246 |
| 2,967,267 | 1/1961 | Steinman et al. | 317—101 |
| 3,043,994 | 7/1962 | Anderson et al. | 336—96 |
| 3,131,331 | 4/1964 | Ray | 336—96 X |
| 3,143,697 | 8/1964 | Springer | 320—2 |

J. D. MILLER, Primary Examiner

A. D. PELLINEN, Assistant Examiner

U.S. Cl. X.R.
310—50; 336—96